Dec. 11, 1945.  D. W. HOPKINS  2,390,882
DECLUTCHING DEVICES FOR POWER DRIVEN BUTTERFLY VALVES
Filed Sept. 7, 1942  2 Sheets-Sheet 1
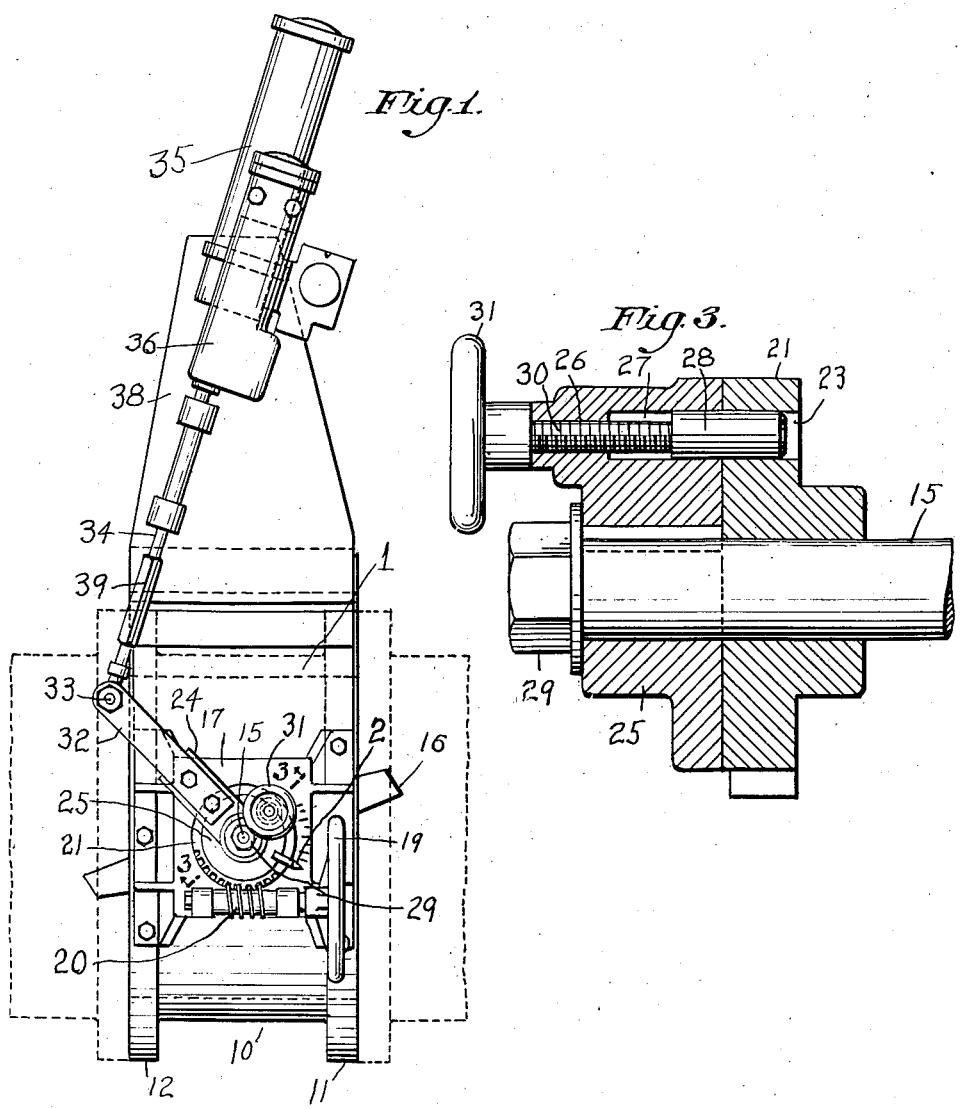
INVENTOR
David W. Hopkins
BY
Barr Borden & Fox
ATTORNEYS Dec. 11, 1945.　　　D. W. HOPKINS　　　2,390,882
DECLUTCHING DEVICES FOR POWER DRIVEN BUTTERFLY VALVES
Filed Sept. 7, 1942　　　2 Sheets-Sheet 2
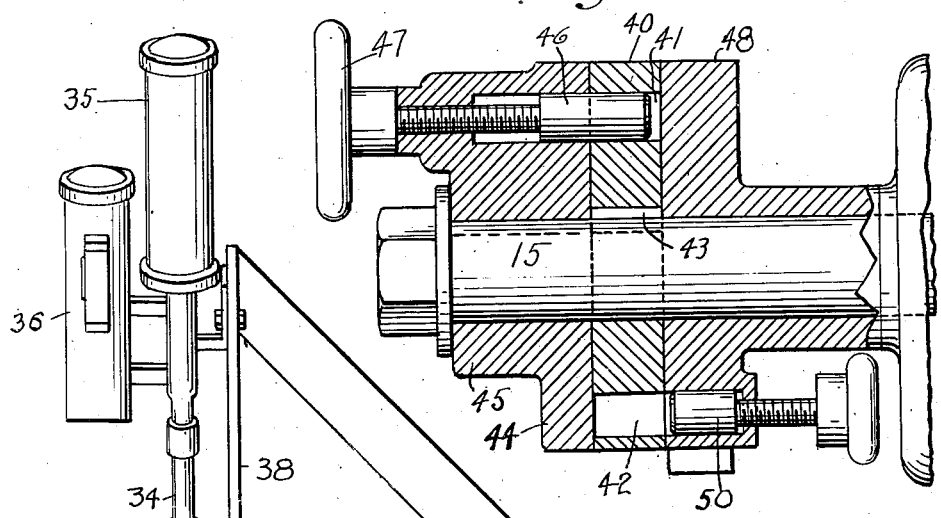
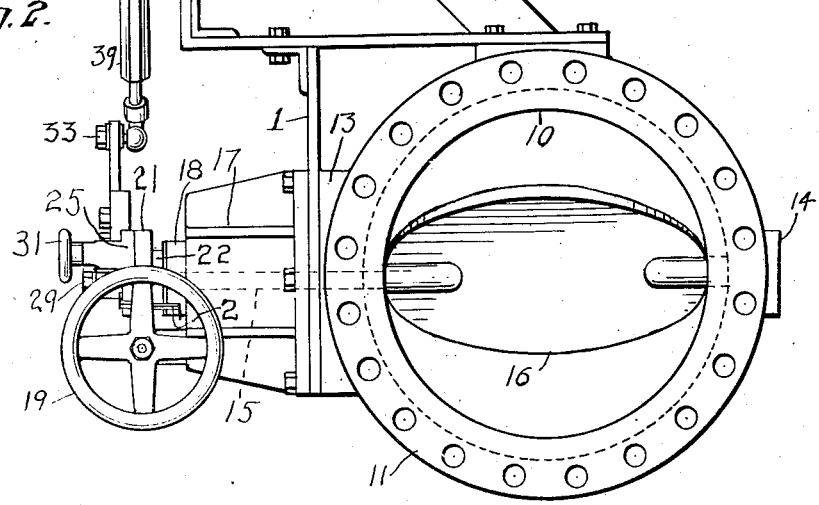
INVENTOR
David W. Hopkins
BY
Barr Borden & Fox
ATTORNEYS Patented Dec. 11, 1945

2,390,882

UNITED STATES PATENT OFFICE 2,390,882

DECLUTCHING DEVICE FOR POWER-DRIVEN BUTTERFLY VALVES

David W. Hopkins, Philadelphia, Pa.

Application September 7, 1942, Serial No. 457,580

4 Claims. (Cl. 74—407)

This invention relates to declutching devices for power driven butterfly valves.

There are many places in the arts and industries where a butterfly valve controlling the flow of fluid in a conduit or pipe requires automatic control and operation so that some power device is necessary for actuating the valve vane. The power devices are of many different sorts depending upon the factors governing the installation, such as, for instance, the convenience of the power, the cost, the size or displacement, or the like, but the purpose of each is to impose a suitable amount of torque on the vane actuating shaft of the valve. The power source may be of any sort such as an electric, pneumatic or hydraulic motor or the like, which drives a reciprocating member which engages an arm coupled in driving relation to the valve shaft. In most prior art installations the failure of the motor or of its power supply puts the entire valve assembly out of action, as it is practically impossible to effect manual operation of the ordinary power driven valve. The past structures have made it practically impossible to detach the power unit from the valve assembly so as to repair same, desirable as this may be, without also putting the valve itself out of operation. In certain instances, in the case of an electric motor operator for the valve, a hand wheel has been provided in the past, whereby, in the case of power failure, the hand wheel can be turned in a duplication of the rotations of the armature of the motor to slowly actuate the valve. So far as known most of these devices are permanently coupled to the motor so that the hand wheel turns as the motor turns. It has been sought to convert this undesirable practice into a virtue by using the hand wheel as a guide and indicator of the motor operation. It will be obvious that the number of turns necessary to operate the valve by the hand wheel working through the gear reduction of the motor will be such that no emergency operation is possible, as such hand wheel operation is too slow.

It is among the objects of this invention: to overcome defects of the prior art; to improve valve operating mechanism; to provide a declutching unit in the line between a hand operator and a power operator for a valve; to provide a power valve assembly with means for directly manually actuating the valve; and many other objects will become more apparent as the description proceeds.

In the accompanying drawings:

Fig. 1 represents an elevation of a valve and power assembly in an illustrative form.

Fig. 2 represents a side elevation of the same.

Fig. 3 represents a section on line 3—3 of Fig. 1.

Fig. 4 represents a section through a modified form of declutching unit.

In the drawings, a substantially cylindrical valve housing 10 is provided merging at opposite ends into attaching flanges 11 and 12 so as to secure the valve in the fluid line in the usual way. A flat faced boss 13 is provided on one side of the cylinder 10, diametrically opposite to a similar but smaller boss 14 on the other side of the housing. In the usual manner both bosses are apertured to receive the shaft 15 upon which the butterfly vane 16 is keyed or secured for oscillation with the shaft, between open and closed positions in the cylindrical member 10. Obviously, it is not necessary that the valve movements be to the extremes, but the closing movement may stop at a desired angular disposition short of actual closing. Similarly, the open position can be less than fully open. This is all in accordance with the particular necessities imposed by the function of the valve in a given installation.

A webbed supporting platform and housing 17 is mounted on the plane end of boss 13 clamping a supporting web or plate 1 thereto, and terminates ontwardly in the reduced boss 18 suitably apertured and bushed to receive the shaft 15. A worm 20 is mounted on suitable bearings on the platform housing 17 in constant mesh with a pinion gear 21 which is normally freely rotatable upon shaft 15 and has an integral spacing hub 22 juxtaposed to the end of the boss 18. The worm 20 is keyed to a hand wheel 19. In an illustrative form the segmental or complete gear 21 is provided with a recess or through aperture 23, as a keeper for the latch or detent to be described.

A torque arm 24 has an enlarged apertured end or hub 25 which is keyed to the shaft 15 to turn therewith. In the hub 25 in spaced parallel relation to the axis of the shaft 15 there is provided a transverse compound aperture 26 comprising a threaded portion leading from the surface of the arm into an enlarged recess portion 27 of the same size and shape and same spacing from the axis as the recess or aperture 23 in the gear 21. A latch or pawl element 28 is provided of such length as to be receivable entirely within the recessed portion 27 of the compound aperture 26, or to be extended therefrom, in protrusion from the hub, to lie partially within the recess 27 of the hub and partially in the aperture 23 of the gear. The pawl is mounted for axial movement in the recess 27 of aperture 26 by means of a threaded shank 30 and the hand wheel 31 rotatable therewith. Obviously, the element 28 can be rigid with the shaft 30 to turn therewith with round registering openings, or it can be swiveled thereon if the registering apertures are not annular, or it could comprise an internally threaded traveling nut with the threaded shank rotatable in an unthreaded end of aperture 26. Of course, any other means for advancing and retracting the latch or pawl are equally applicable, but the threaded relation is preferred for simplicity and positiveness of action.

The arm 24 is held on shaft 15 by a nut 29 and the hub 25 of the arm forms an abutment between which and the boss 18 the gear 21 is held against appreciable axial movement. Arm 24 is preferably suitably channeled for strength and has attached to its free end a lever arm 32, to the free end of which as at 33, a link 34, is pivotally attached as by a ball and socket joint. Preferably, the link 34 is suitably provided with length adjusting and shock absorbing devices, such as at 39. The link 34 is directly coupled with the piston of a power cylinder of any desired sort, such as is illustratively shown at 35 mounted on an extension 38 of supporting web 1. Purely illustratively, the hydraulic cylinder 35 may be controlled by the pneumatic or similar control device 36, and this in turn may be controlled by the pressure conditions on the respective sides of the valve or by operator actuated controls or the like.

In the power use of the valve the hydraulic cylinder 35 exerts suitable push-pull effects upon the link 34 so as to provide sufficient torque as to swing the valve between the predetermined extremes of position of the vane thereof. Before power is applied and during all power actuation, of course, the pawl or detent 28 is retracted from its joint engagement with both the hub and the gear to a position housed in the hub such that the arm with the shaft to which it is coupled or keyed can swing in its oscillatory path without moving the gear 21. In this case, the withdrawn detent 28 swings in an arc in periodic transitory registration without coupling with the aperture 23 in the gear 21.

With failure of the power or the motor, the wheel or the like 31 of the declutcher is actuated after the hand wheel 19 has been rotated through an angular distance such as to bring the gear 21 into such relation to hub 25 of arm 24 that the apertures register, whereupon the pawl 28 is forced laterally inwardly to interengage with both the arm hub 25 and gear 21. If the power source is such as to permit it, the valve is then directly actuated through manipulations of the hand wheel 19. The power source may thereupon be removed and repaired or replaced without interfering with the controlled operation of the valve. Of course, if the power source is one that cannot safely or satisfactorily be reversely driven, such as an electric motor with gearing in the line, the linkage system will have to include an additional declutching unit, and this is potentially true of all power sources that cannot be reversely driven. However, it is a simple matter to by-pass the fluid ahead of the advancing piston of a fluid motor so as to enable free hand operation. The linkage may easily be disconnected if desired during hand operation. While the second declutching unit may be interposed on the power end of the linkage remote from the valve itself, it will be obvious that a simple unit can be formed comprised of the arm hub, which in this case will not be keyed to the shaft but mounted loosely thereon for free rotation, as will the gear, with an intermediate hub or declutching member keyed to the shaft and arranged to be selectively secured and anchored to either the power actuated arm, or the hand operated gear wheel. Such simplified unit is within contemplation herein and is disclosed in a purely illustrative form in Fig. 4.

Referring to this figure, the shaft 15 carries the intermediate disc-like hub or clutching member 40 provided with a pair of spaced transverse through apertures or holes, respectively 41 and 42. The disc is keyed by spline 43 directly to the shaft 15 and is in constant driving relation thereto. The power arm 44 similar to that described terminates in an enlargement or hub 45 carrying the adjustable detent 46 controlled by hand wheel or screw 47 and, illustratively, this is exactly like the detent shown in Fig. 3 in its details and will not be further described. This is arranged to couple the freely rotatable shaft 15 in the hub 45 to the fixed disc structure 40 to establish driving relations between the power arm and the valve shaft. Similarly, for use when the first detent assembly is disengaged, as when the power is removed, the gear 48 is loosely journalled on shaft 15 beside the keyed disc 40, and carries the manually controllable detent assembly 50, arranged for selective insertion into and removal from the aperture 42 in the disc 40, just as in the declutching unit shown in Fig. 3, to establish driving relation between the hand wheel and worm driving the gear 48 and the shaft 15. The alternate coupling available from this assembly will be obvious, as will its utility.

It will be understood that the hand wheel controls may be remote chain or similarly operated devices. As is conventional with such butterfly valves, any suitable position indicator may be provided, such as shown at 2, in Fig. 1.

Having thus described my invention, I claim:

1. In a valve, an oscillatible shaft, a motor, linkage connected to the motor and arranged for reciprocation, an arm mounted on the shaft having a free end pivotally connected to the reciprocating linkage, said arm carrying a detent element arranged for selective disposition either within the arm or protruding therefrom transversely thereof, a gear rotatably mounted on the shaft, a second gear for rotating the first gear, said first gear having a recess with which the detent element engages in the protruding position to establish driving relation between the second gear and the shaft.

2. In a valve, an oscillatible shaft, means coupled for constant driving relation with the shaft and having a substantially flat bearing face lying in a plane substantially normal to the shaft, power actuated means for oscillating the first mentioned means and comprising a motor, linkage connected to the motor and arranged for reciprocation, and a lever having one end pivotally connected to the reciprocating linkage and its other end operatively associated in driving relation with the first said means, a gear wheel having a substantially flat bearing face substantially normal to the axis of the shaft juxtaposed in bearing relation to the substantially flat bearing face on the first mentioned means mounted loosely upon the shaft, and means operative to couple the first means and the gear together when desired comprising a part adapted to traverse both of the juxtaposed substantially flat faces.

3. In a valve, an oscillatible shaft, a gear wheel loosely journalled on the shaft and having a substantially flat face substantially normal to the shaft, a disc element keyed to the shaft adjacent to the gear and having a substantially flat face normal to the shaft juxtaposed to the substantially flat face of the gear wheel, a motor, linkage connected to the motor and arranged for reciprocation and a lever having one end pivotally connected to the reciprocating linkage and mounted at the other end upon said disc element and comprising means delivering torque to the disc for moving the shaft, means for selectively coupling the disc and the gear comprising means adapted to traverse the juxtaposed substantially flat faces, and a second gear in constant mesh with the first gear for actuating the shaft when the first gear and disc are coupled.

4. In a valve, an oscillatible shaft, a gear wheel loosely journalled on the shaft, a disc element keyed to the shaft adjacent to the gear, means delivering torque to the disc for moving the shaft, means for selectively coupling the disc and the gear, a gear in constant mesh with the gear for actuating the shaft when the first gear and disc are coupled, the torque delivering means comprising a motor, a reciprocating link, an arm pivoted on an axis concentric with the shaft, means establishing a driving connection between the motor and the shaft and arranged for manual disestablishment of the connection.

DAVID W. HOPKINS.